United States Patent
Fabrizi et al.

(10) Patent No.: US 10,146,529 B2
(45) Date of Patent: Dec. 4, 2018

(54) MONITORING RULES DECLARATION AND AUTOMATIC CONFIGURATION OF THE MONITORING RULES

(71) Applicant: International Business Machines Corporation, Armonk, NY (US)

(72) Inventors: Francesco Fabrizi, Rome (IT); Andrea Gianfelici, Rome (IT); Angelo Littera, Rome (IT); Claudio Valant, Rome (IT)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/195,091

(22) Filed: Jun. 28, 2016

(65) Prior Publication Data

US 2017/0371648 A1    Dec. 28, 2017

(51) Int. Cl.
G06F 9/44 (2018.01)
G06F 8/71 (2018.01)
G06F 11/30 (2006.01)

(52) U.S. Cl.
CPC .............. *G06F 8/71* (2013.01); *G06F 11/30* (2013.01)

(58) Field of Classification Search
CPC ....................................................... G06F 8/71
See application file for complete search history.

(56) References Cited

U.S. PATENT DOCUMENTS

| 8,799,448 B2 | 8/2014 | Yan et al. |
| 2006/0248523 A1* | 11/2006 | Berg ................... G06F 8/73 717/174 |
| 2008/0155517 A1* | 6/2008 | Yan ................ G06F 11/3466 717/140 |
| 2010/0057780 A1* | 3/2010 | Isobe .................. G06F 8/71 707/E17.045 |
| 2012/0084780 A1 | 4/2012 | Pasternak |
| 2012/0158619 A1* | 6/2012 | Dani ................... G06N 5/025 706/12 |

FOREIGN PATENT DOCUMENTS

| WO | 2008095787 A1 | 8/2008 |
| WO | 2013164302 A1 | 11/2013 |

OTHER PUBLICATIONS

Cianciaruso et al. "Using Models at Runtime to Support Adaptable Monitoring of Multi-Clouds Applications", Department of Electronic and Information Bioengineering, Academic Year 2013-2014.

* cited by examiner

*Primary Examiner* — Hang Pan
(74) *Attorney, Agent, or Firm* — Brown & Michaels, PC; David Woycechowsky

(57) ABSTRACT

During development of an application storing monitoring tools within the source code of the application. During deployment, extracting all monitoring rules from the source code of the application; obtaining information to complete the monitoring rules and customize the monitoring rules to the application which is to be monitored; discarding duplicate monitoring rules; and sending the monitoring rules to a target monitoring tool for configuration of monitoring rules within the application.

15 Claims, 4 Drawing Sheets

MONITORING RULES DECLARATION AND AUTOMATIC CONFIGURATION OF THE MONITORING RULES

BACKGROUND

The present invention relates to monitoring rules applied to software and hardware components in a system, and more specifically to declaration of the monitoring rules and automatic configuration of the monitoring rules applied to software and hardware components of a system.

One area of system management discipline of the enterprise-wide administration of a datacenter is monitoring of services' health. In this area, tools can potentially monitor any types of hardware and software components, applying the appropriate measuring to verify the adherence to pre-defined goals. Consequently, an effective monitoring starts from clear objectives and depends on good decisions about how and which components have to be monitored. In terms of custom software applications, an effective monitoring of these services requires a close collaboration between developers and IT operations. In fact, beyond the infrastructure monitoring, the developers declare which components (e.g. application servers, queues, database, etc.) have to be monitored and which metrics and goals to use. This way, IT operations can configure the monitoring tools with the appropriate level of details. However, this kind of work usually does not start before the application is deployed on the production environment and rarely is it maintained over the time. Due to this lack of collaboration between developers and IT operations, the monitoring tools often limit their control to checks at an infrastructure level (e.g. server, network device, etc.) and this limitation may be the cause of business disruption.

SUMMARY

According to one embodiment of the present invention, a method of deploying monitoring rules stored within source code of an application is disclosed. The method comprising the steps of: a computer extracting all monitoring rules from the source code of the application; the computer obtaining information to complete the monitoring rules and customize the monitoring rules to the application which is to be monitored; the computer discarding duplicate monitoring rules; and the computer sending the monitoring rules to a target monitoring tool for configuration of monitoring rules within the application.

According to another embodiment of the present invention, a computer program product for deploying monitoring rules stored within source code of an application is disclosed. The computer program product including a computer comprising at least one processor, one or more memories, one or more computer readable storage media, the computer program product comprising a computer readable storage medium having program instructions embodied therewith. The program instructions executable by the computer to perform a method comprising: extracting, by the computer, all monitoring rules from the source code of the application; obtaining, by the computer, information to complete the monitoring rules and customize the monitoring rules to the application which is to be monitored; discarding, by the computer, duplicate monitoring rules; and sending, by the computer, the monitoring rules to a target monitoring tool for configuration of monitoring rules within the application.

According to another embodiment of the present invention, a computer system for deploying monitoring rules stored within source code of an application is disclosed. The computer system comprising a computer comprising at least one processor, one or more memories, one or more computer readable storage media having program instructions executable by the computer to perform the program instructions. The program instructions comprising: extracting, by the computer, all monitoring rules from the source code of the application; obtaining, by the computer, information to complete the monitoring rules and customize the monitoring rules to the application which is to be monitored; discarding, by the computer, duplicate monitoring rules; and sending, by the computer, the monitoring rules to a target monitoring tool for configuration of monitoring rules within the application.

DETAILED DESCRIPTION

In one embodiment of the present invention, it is recognized that a method of declaring monitoring rules at development time of an application, for example using an Integrated Development Environment (IDE), would be beneficial.

In one embodiment, the monitoring rules of a component or application of a component of a system may be declared by formal grammar at development and deployment of the component or application. The monitoring rules may be inserted into the source code of an application at development time of the application. At the time of deployment, the monitoring rules may be extracted from the binary modules of the application. Once the monitoring rules are extracted, the rules may be completed and/or additional monitoring tools may be provided by developers and the rules are integrated into the system.

Figure 1:
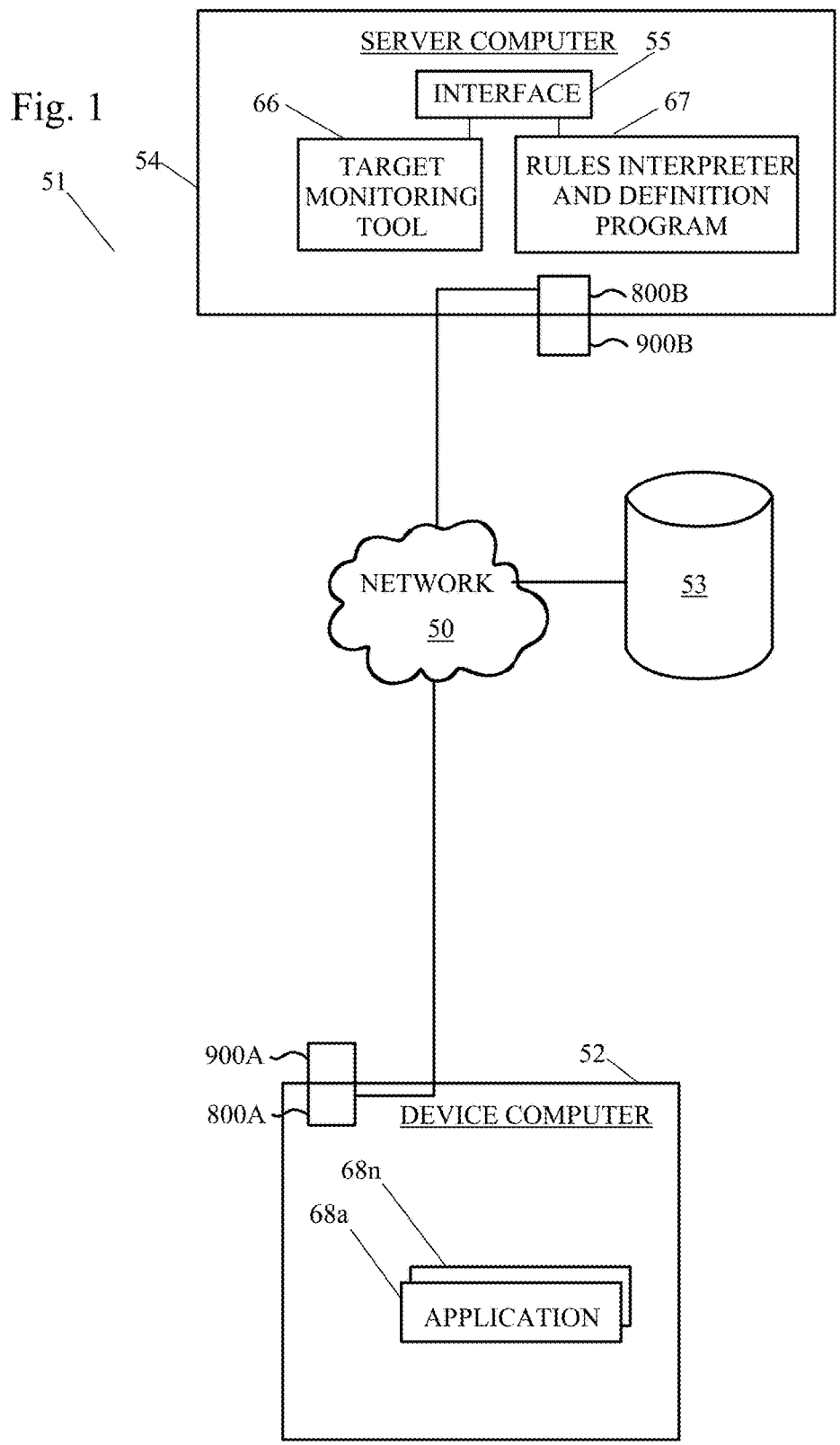
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown. Applications 68a-68n may be present on the additional client or device computers or other devices not shown.

The device computer 52 may contain an interface, which may accept commands and data entry from a user. The interface can be, for example, a command line interface, a graphical user interface (GUI), a natural user interface (NUI) or a touch user interface (TUI). The device computer 52 may contain a plurality of applications 68a-68n, some of which are customized. The device computer 52 includes a set of internal components 800a and a set of external components 900a, further illustrated in FIG. 4.

Figure 4:
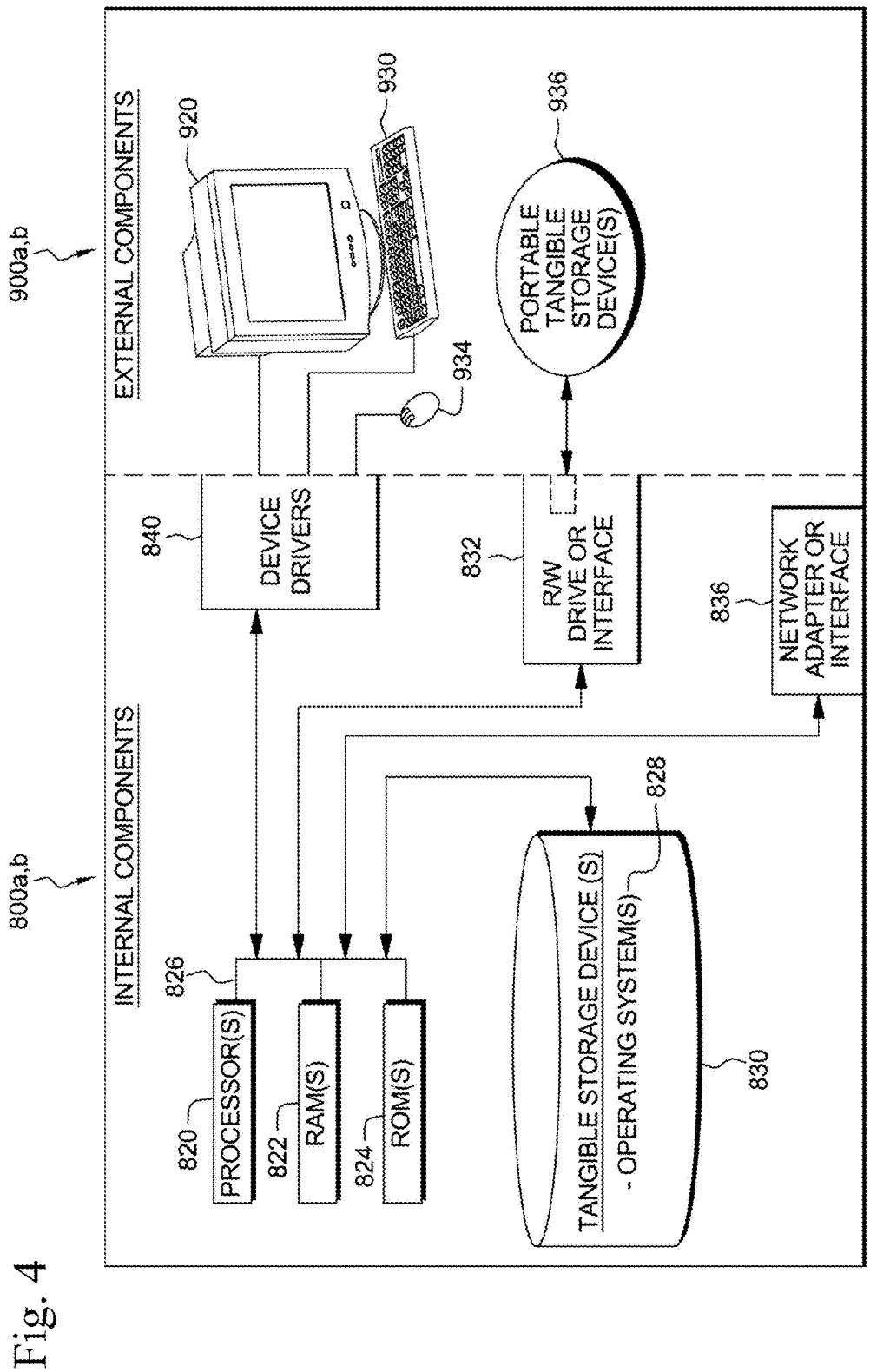
FIG. 4 shows internal and external components of a device computer and a server computer in which illustrative embodiments may be implemented.

Server computer 54 includes a set of internal components 800b and a set of external components 900b illustrated in FIG. 4. In the depicted example, server computer 54 provides information, such as boot files, operating system images, and applications to the device computer 52. The server computer 54 may contain an interface 55 which may accept commands and data entry from a user, for example monitoring rules. The interface can be, for example, a command line interface, a graphical user interface (GUI), a natural user interface (NUI) or a touch user interface (TUI). The server computer preferably contains a target monitoring tool program 66 and a rules interpreter and definition program 67. Server computer 54 can compute the information locally or extract the information from other computers on network 50. While not shown, the rules interpreter and definition program 67 and target monitoring tool 66 may also be present on the device computer 52.

Figure 2:
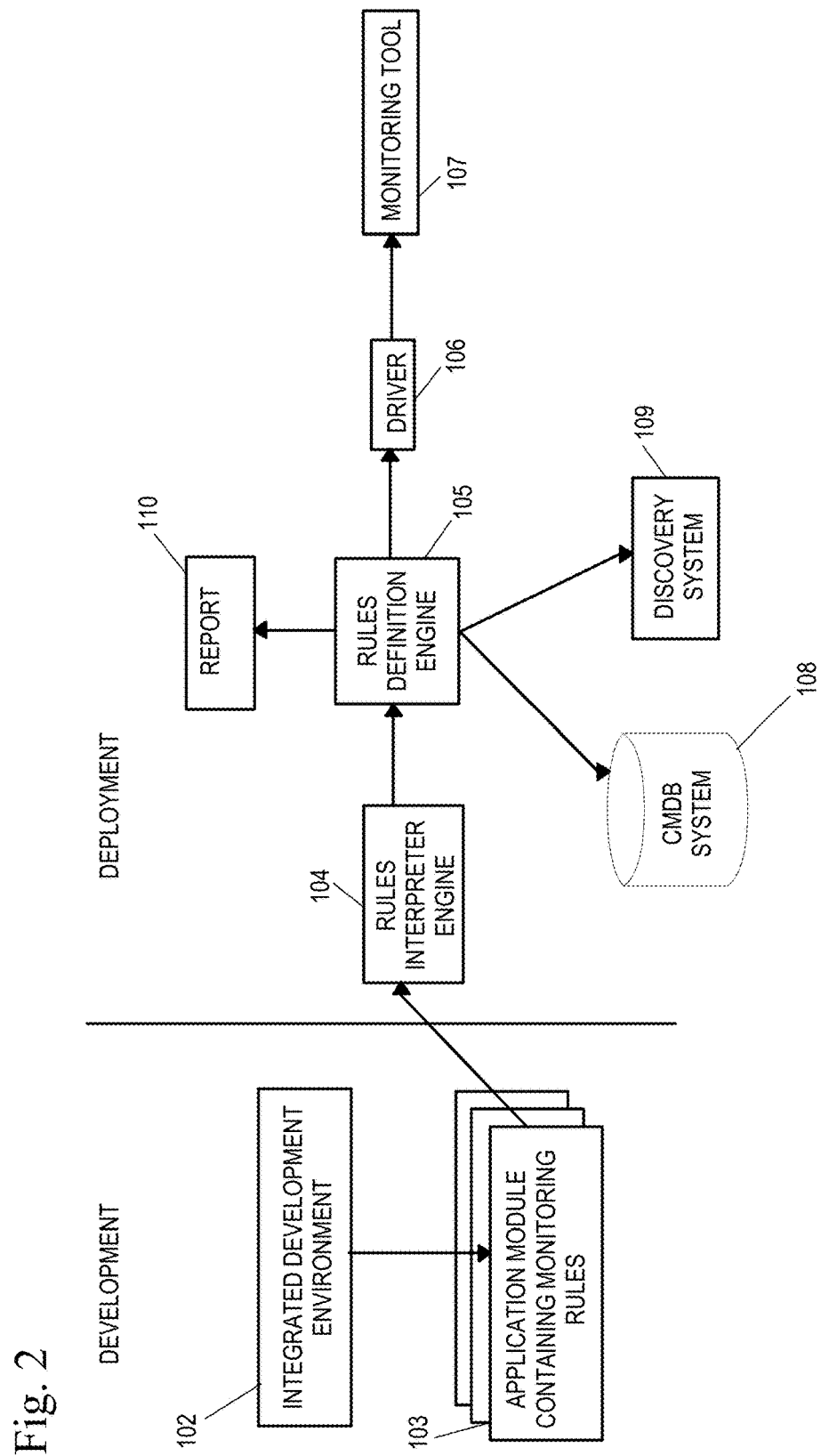
FIG. 2 shows a schematic of the declaration and implementation of monitoring tools.

FIG. 2 shows a schematic of establishing monitoring rules for an application of a component of a system during development and deployment of the application.

It should be noted that a monitoring rule defines which component/aspect should be monitored and how it should be monitored within the system.

An annotation is a way to insert metadata into the source code and compiled code of an application. The compiled source code stores or keeps the metadata. The metadata has no influence on behavior of the application. Therefore, annotations may be inserted into source code, and the annotations may be easily extracted from the compiled code of the applications. The annotations provide a method of using formal grammar for declaring monitoring rules. Hence, the annotations may be used to provide monitoring rules throughout the natural software life cycle process, guaranteeing a continuous updating of the rules over time.

Various programming languages for the source code of the application and relative compilers may be used. The programming language in which the compiled code is in must allow the insertion of annotations into the source code. The compiler has to include the annotations into the compiled code (aka binary code). The annotated monitoring rules within the compiled code must not influence the application behavior.

Many existing programming languages already provide methods to insert metadata into the source code and attribute-oriented programming is a well-known program-level marking technique. For instance, Java provides a method to handle annotations, as well as Scala and Perl.

During deployment of the application as part of the software development life cycle, developers declare necessary monitoring rules, for example through an Integrated Development Environment (IDE) (102). The IDE is a programming environment that has been packaged as an application program, typically consisting of a code editor, a compiler, a debugger, and a graphical user interface (GUI) builder.

The monitoring rules are inserted within the source code as annotations and may be stored in binary modules of the application (103). An example of the monitoring rules for an application may be as follows:

The number of messages into the queue "xyz" must be less than X.

The response time of the execution of the SQL command "xyz" on database "abc" must be less than X milliseconds.

The free space of the file-system "def" on the file server "lmn" must be greater than X Mbytes.

During deployment of the application during the software development life cycle, a rules interpreter engine 104, a rules definition engine 105, and a driver 106 are used to complete the monitoring rules and adapt the rules for implementation during actual deployment of the application. It should be noted that the rules interpreter engine 104, the rules definition engine 105, and the driver 106 may all be implemented through the rules interpreter and definitions program 67 or may be separate programs.

The rules interpreter engine 104 extracts the monitoring rules from the binary modules of the application and checks the extracted rules for consistency relative to the system in which the application is to be deployed.

The rules definition engine 105 accesses configuration management database (CMDB) systems 108 and discovery systems 109 to complete information missing from the rules.

At development time, developers declare monitoring rules without knowing all information about the future target infrastructure of their application. For instance, based on the rules provided as an example above, at the time of development of the application, a developer would not know the following information: IP address and IP port of the queue manager server that hosts the queue "xyz"; the IP address and IP port of the database server that hosts the database "abc"; and the IP address and IP port of the file server "def" that hosts the file-system "lmn".

The rules definition engine 105 also optimizes all defined rules by removing any duplicates and can generate a report 110 which lists all defined rules.

A driver 106 receives the defined, optimized monitoring rules and enables automatic configuration of the monitoring rules into a target monitoring tool 107. The driver translates the rules into a configuration procedure for an existing target monitoring tool.

The target monitoring tool 107 allows for efficient monitoring of the deployed application over the life of the application.

Figure 3:
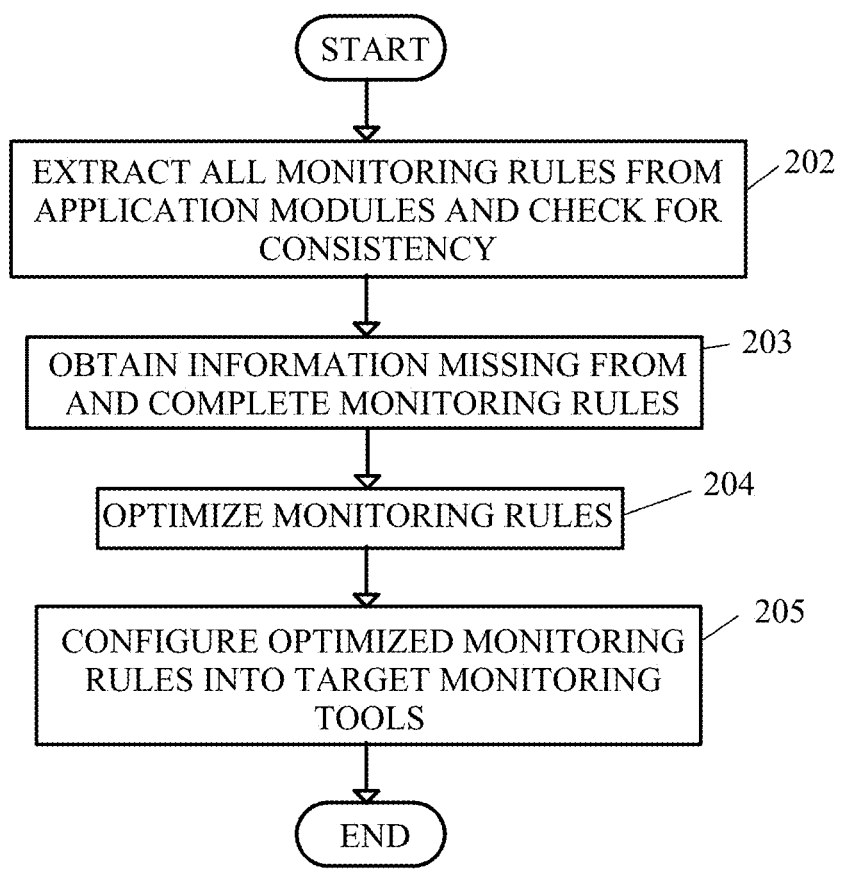
FIG. 3 shows a flow diagram of a method of deploying monitoring rules stored within source code of an application.

FIG. 3 shows a flow diagram of a method of deploying monitoring rules stored within source code of an application.

It should be noted that prior to deploying the monitoring rules, monitoring rules are inserted into source code as annotations and are compiled into an application module of the application during development of the application. Therefore, when an application is ready for deployment, binary modules contain the monitoring rules declared by developers. The application modules are also released to the system for automatic configuration of monitoring tools.

In a first step, a rules interpreter and definition program 67 extracts all monitoring rules from application modules of an application and are checked for consistency (step 202). The extraction may be carried out by a rules interpreter engine 104 which is part of a rules interpreter and definition program 67.

The information within the monitoring rules is then completed (step 203), for example by the rules definition engine 105 of the rules interpreter and definition program 67. As discussed above, certain information needed to qualify the monitoring rules is not known during development of the application. However, the information is available from configuration management database (CMDB) systems 108 or discovery systems 109. Examples of CMDB and discovery systems are Tivoli® Application Dependency Discovery Manager (TADDM) provided by IBM®, Control Desk unified IT asset and service management software provided by IBM®, uCMDB provided by Hewlett Packard®, BMC Discovery from BMC Software® and other such systems.

This way, at deployment time, the rules definition engine 105 of the rules interpreter and definition program 67 accesses CMDB systems 108 or discovery systems 109 to obtain information missing from the monitoring rules and to complete the information of the rules provided by developers, as well as to declare additional consequent rules.

For example, the rules definition engine 105 can obtain the name of the queue manager server from CMDB systems 108 or it may query an external discovery system 109, which queue manager server hosts the specified queue ("xyz").

Once the rules are complete and no additional rules are to be added, the rules definition engine 105 of the rules interpreter and definition program 67 optimizes all of the defined rules, discarding duplications (step 204). A report 109 may be generated that documents all of the defined monitoring rules for an application and displayed or sent to a user, such as a developer or administrator.

The rules are then sent to a target monitoring tool (step 205) and the method ends. The target monitoring tool 66 contains a program that allows to automatically configure and deploy the monitoring rules, in order to effectively monitor the target applications 68a-68n.

FIG. 4 illustrates internal and external components of a device computer 52 and server computer 54 in which illustrative embodiments may be implemented. In FIG. 4, a device computer 52 and a server computer 54, include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the rules interpreter and definition program 67 and the target monitoring tool 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Rules interpreter and definition program 67 and target monitoring tool 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Rules interpreter and definition program 67 and target monitoring tool 66 can be downloaded to the device computer 52 and server computer 54 from an external computer via a network (for example, the Internet, a local area network or other, wide area network) and network adapter or interface 836. From the network adapter or interface 836, target monitoring tool program 66 is loaded into hard drive 830. Rules interpreter and definition program 67 and target monitoring tool 66 can be downloaded to the server computer 54 from an external computer via a network (for example, the Internet, a local area network or other, wide area network) and network adapter or interface 836. From the network adapter or interface 836, target monitoring tool program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Rules interpreter and definition program 67 and target monitoring tool 66 can be written in various programming languages including low-level, high-level, object-oriented or non object-oriented languages. Alternatively, the functions of a rules interpreter and definition program 67 and target monitoring tool 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of establishing monitoring rules for an application of a component of a system and deploying monitoring rules stored within source code of an application during development and deployment of the application comprising the steps of:
   during development of the application, the computer:
      declaring monitoring rules to define which component of the application is to be monitored and how the application is to be monitored within the system;
      inserting monitoring rules into the source code of the application as annotations;
      compiling the annotations into an application module of the application which includes placeholders for future target infrastructure of the application;
   during deployment of the application, the computer:
      extracting all monitoring rules from the source code of the application;
      obtaining information to replace the placeholders within the monitoring rules to complete the monitoring rules and customize the monitoring rules to the application which is to be monitored within the system;
      discarding duplicate monitoring rules; and
      sending the monitoring rules to a target monitoring tool which are utilized for configuration of monitoring rules within the application.

2. The method of claim 1, wherein the step of extracting all monitoring rules from the source code of the application further comprises the step of checking the extracted monitoring rules for consistency.

3. The method of claim 1, wherein the information to complete the monitoring rules is obtained from a configuration management database system.

4. The method of claim 1, wherein the information to complete the monitoring rules is obtained from a discovery system.

5. The method of claim 1, wherein, after the step of discarding duplicate monitoring rules, the computer generating a document with all defined monitoring rules for an application.

6. A computer program product for establishing monitoring rules for an application of a component of a system and deploying monitoring rules stored within source code of an application during development and deployment of the application, a computer comprising at least one processor, one or more memories, one or more computer readable storage media, the computer program product comprising a computer readable storage medium having program instructions embodied therewith, the program instructions executable by the computer to perform a method comprising:

during development of the application:

declaring, by the computer, monitoring rules to define which component of the application is to be monitored and how the application is to be monitored within the system;

inserting, by the computer, monitoring rules into the source code of the application as annotations;

compiling, by the computer, the annotations into an application module of the application which includes placeholders for future target infrastructure of the application;

during deployment of the application:

extracting, by the computer, all monitoring rules from the source code of the application;

obtaining, by the computer, information to replace the placeholders within the monitoring rules to complete the monitoring rules and customize the monitoring rules to the application which is to be monitored within the system;

discarding, by the computer, duplicate monitoring rules; and sending, by the computer, the monitoring rules to a target monitoring tool which are utilized for configuration of monitoring rules within the application.

7. The computer program product of claim 6, wherein the program instructions of extracting, by the computer, all monitoring rules from the source code of the application further comprises checking, by the computer, the extracted monitoring rules for consistency.

8. The computer program product of claim 6, wherein the information to complete the monitoring rules is obtained from a configuration management database system.

9. The computer program product of claim 6, wherein the information to complete the monitoring rules is obtained from a discovery system.

10. The computer program product of claim 6, wherein, after the program instructions of discarding, by the computer, duplicate monitoring rules, generating, by the computer, a document with all defined monitoring rules for an application.

11. A computer system for establishing monitoring rules for an application of a component of a system and deploying monitoring rules stored within source code of an application during development and deployment of the application, comprising a computer comprising at least one processor, one or more memories, one or more computer readable storage media having program instructions executable by the computer to perform the program instructions comprising:

during development of the application:

declaring, by the computer, monitoring rules to define which component of the application is to be monitored and how the application is to be monitored within the system;

inserting, by the computer, monitoring rules into the source code of the application as annotations;

compiling, by the computer, the annotations into an application module of the application which includes placeholders for future target infrastructure of the application;

during deployment of the application:

extracting, by the computer, all monitoring rules from the source code of the application;

obtaining, by the computer, information to replace the placeholders within the monitoring rules to complete the monitoring rules and customize the monitoring rules to the application which is to be monitored within the system;

discarding, by the computer, duplicate monitoring rules; and sending, by the computer, the monitoring rules to a target monitoring tool which are utilized for configuration of monitoring rules within the application.

12. The computer system of claim 11, wherein the program instructions of extracting, by the computer, all monitoring rules from the source code of the application further comprises checking, by the computer, the extracted monitoring rules for consistency.

13. The computer system of claim 11, wherein the information to complete the monitoring rules is obtained from a configuration management database system.

14. The computer system of claim 11, wherein the information to complete the monitoring rules is obtained from a discovery system.

15. The system of claim 11, wherein, after the program instructions of discarding, by the computer, duplicate monitoring rules, generating, by the computer, a document with all defined monitoring rules for an application.

* * * * *